(12) United States Patent
Shiraishi

(10) Patent No.: US 8,891,919 B2
(45) Date of Patent: Nov. 18, 2014

(54) OPTICAL DEVICE, OPTICAL CONNECTOR, AND OPTICAL MODULE

(75) Inventor: Takashi Shiraishi, Isehara (JP)

(73) Assignee: Fujitsu Limited, Kawasaki (JP)

( * ) Notice: Subject to any disclaimer, the term of this patent is extended or adjusted under 35 U.S.C. 154(b) by 194 days.

(21) Appl. No.: 13/453,117

(22) Filed: Apr. 23, 2012

(65) Prior Publication Data

US 2013/0028559 A1    Jan. 31, 2013

(30) Foreign Application Priority Data

Jul. 29, 2011    (JP) .................................. 2011-167569

(51) Int. Cl.
*G02B 6/32* (2006.01)
*G02B 6/38* (2006.01)

(52) U.S. Cl.
CPC .............. *G02B 6/322* (2013.01); *G02B 6/3885* (2013.01)
USPC ................... 385/33; 385/15; 385/31; 385/32; 385/34; 385/35

(58) Field of Classification Search
USPC ............................... 385/15, 31, 33, 34, 35, 36
See application file for complete search history.

(56) References Cited

U.S. PATENT DOCUMENTS

| 4,439,022 | A * | 3/1984 | Gebhardt et al. ............. 359/363 |
| 2010/0208756 | A1 * | 8/2010 | Noh ................................. 372/20 |

FOREIGN PATENT DOCUMENTS

| JP | 2008-535037 | 8/2008 |
| WO | WO 2006/108024 | 10/2006 |

OTHER PUBLICATIONS

Naomi Kawakami, et al., "PMT Connectors for Polymer Film Waveguide-Optical Interconnections", IEICE Technical Report, R2010-6, CPM2010-6, OPE2010-6; (Apr. 2010), pp. 29-34, Apr. 9, 2010.
Takashi Shiraishi, et al., "Cost-Effective On-board Optical Interconnection Using Waveguide Sheet with Flexible Printed Circuit Optical Engine", OSA/OFC/NFOEC 2011, Mar. 6-10, 2011.
Koji Choki, "Introduction of Optical Circuit Board", Sumitomo Bakelite Co., Ltd., 2008.

* cited by examiner

*Primary Examiner* — Jennifer Doan
(74) *Attorney, Agent, or Firm* — Staas & Halsey LLP

(57) ABSTRACT

An optical device includes first and second optical waveguides that each include a core and a cladding, and a connector that optically couples the first optical waveguide and the second optical waveguide with a lens interposed therebetween, wherein, in at least one of the first and the second optical waveguides, a difference in refractive index between the core and the cladding in a first direction differs from a difference in refractive index between the core and the cladding in a second direction that is different from the first direction, and wherein, in at least one of the first and the second optical waveguide, a first point of emergence of first rays that are output at angles in the first direction and a second point of emergence of second rays that are output at angles in the second direction are offset from each other along an optical axis.

11 Claims, 17 Drawing Sheets

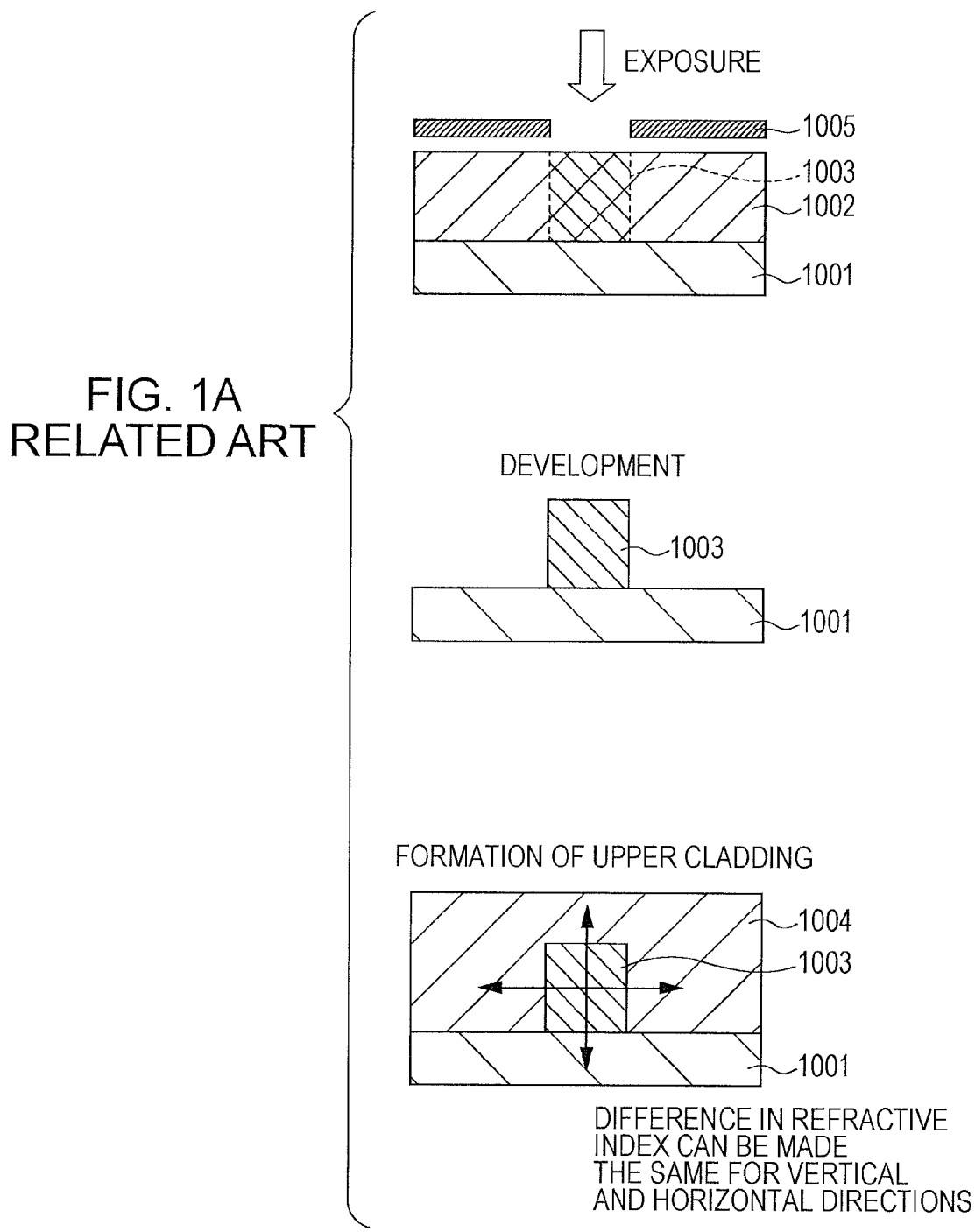

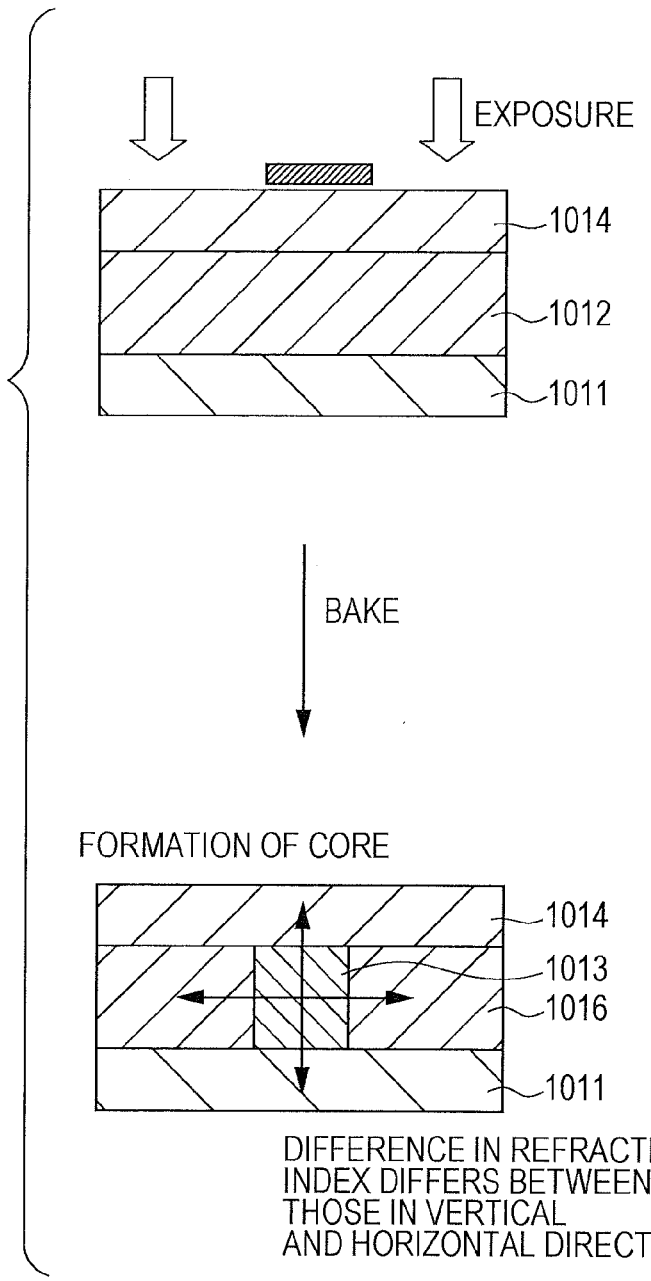

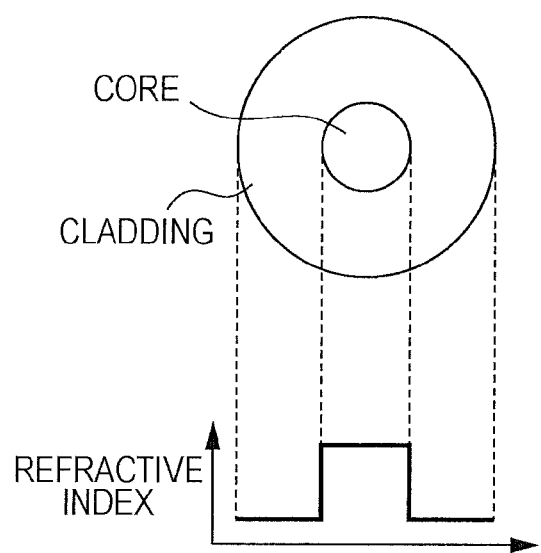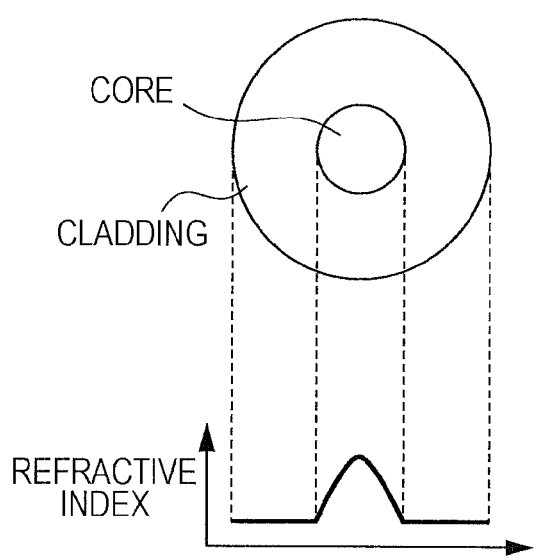

FIG. 5A

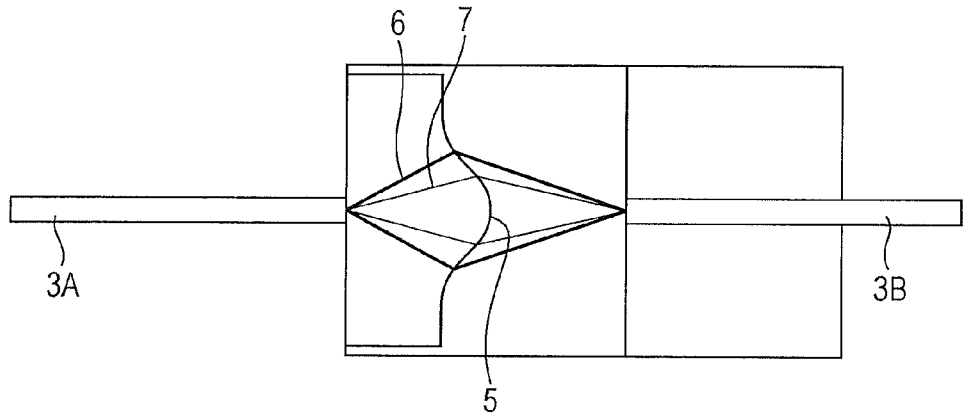

FIG. 5B

| | NA OF WAVEGUIDE 3A | MAXIMUM NAO OF RAYS INPUT TO LENS | MAXIMUM NAO OF RAYS OUTPUT FROM LENS | | NA OF FIBER 3B |
|---|---|---|---|---|---|
| TRANSMISSION | VERTICAL: 0.32<br>HORIZONTAL: 0.24 | VERTICAL: 0.32<br>HORIZONTAL: 0.24 | VERTICAL: 0.27<br>HORIZONTAL: 0.2 | LOSS →<br>GOOD → | VERTICAL: 0.2<br>HORIZONTAL: 0.2 |
| | NA OF WAVEGUIDE 3A | MAXIMUM NAO OF RAYS OUTPUT FROM LENS | MAXIMUM NAO OF RAYS INPUT TO LENS | | NA OF FIBER 3B |
| RECEPTION | VERTICAL: 0.32<br>HORIZONTAL: 0.24 | ← GOOD<br>← GOOD VERTICAL: 0.24<br>HORIZONTAL: 0.24 | VERTICAL: 0.2<br>HORIZONTAL: 0.2 | | VERTICAL: 0.2<br>HORIZONTAL: 0.2 |

FIG. 5C

| | NA OF WAVEGUIDE 3A | MAXIMUM NAO OF RAYS INPUT TO LENS | MAXIMUM NAO OF RAYS OUTPUT FROM LENS | | NA OF FIBER 3B |
|---|---|---|---|---|---|
| TRANSMISSION | VERTICAL: 0.32<br>HORIZONTAL: 0.24 | VERTICAL: 0.32<br>HORIZONTAL: 0.24 | VERTICAL: 0.2<br>HORIZONTAL: 0.16 | GOOD →<br>GOOD → | VERTICAL: 0.2<br>HORIZONTAL: 0.2 |
| | NA OF WAVEGUIDE 3A | MAXIMUM NAO OF RAYS OUTPUT TO LENS | MAXIMUM NAO OF RAYS INPUT FROM LENS | | NA OF FIBER 3B |
| RECEPTION | VERTICAL: 0.32<br>HORIZONTAL: 0.24 | ← GOOD<br>← LOSS VERTICAL: 0.32<br>HORIZONTAL: 0.32 | VERTICAL: 0.2<br>HORIZONTAL: 0.2 | | VERTICAL: 0.2<br>HORIZONTAL: 0.2 |

POINT OF EMERGENCE OF RAYS 6 ANGLED IN DIRECTION CORRESPONDING TO LARGER NA IS OFFSET FORWARD

| NA OF WAVEGUIDE 4A | MAXIMUM NAO OF RAYS INPUT TO LENS 15 | MAXIMUM NAO OF RAYS OUTPUT FROM LENS 15 | NA OF FIBER 4B |
|---|---|---|---|
| VERTICAL: 0.32 | VERTICAL: 0.32 | VERTICAL: 0.2 | VERTICAL: 0.2 |
| HORIZONTAL: 0.24 | HORIZONTAL: 0.24 | HORIZONTAL: 0.2 | HORIZONTAL: 0.2 |

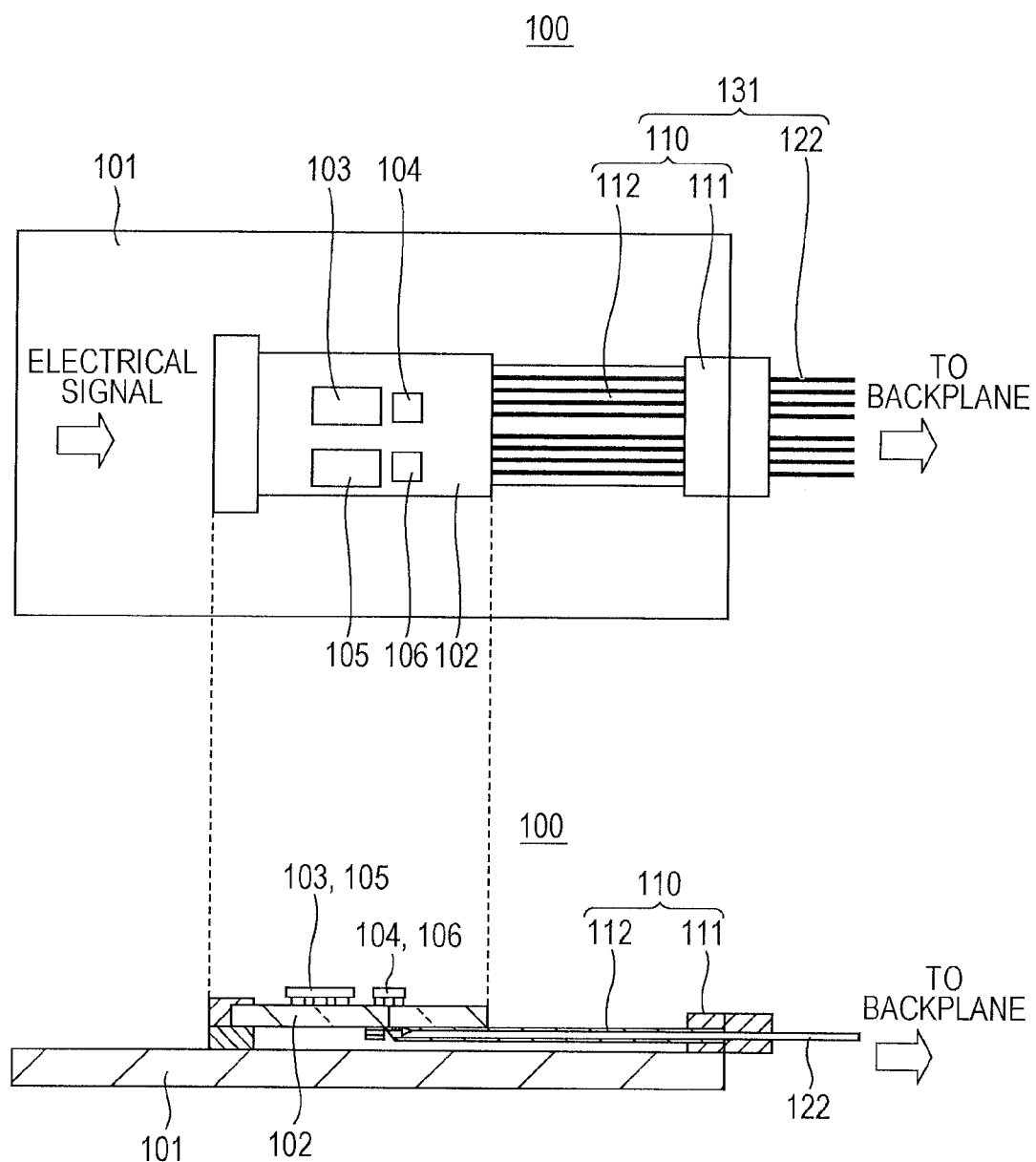

OPTICAL DEVICE, OPTICAL CONNECTOR, AND OPTICAL MODULE

CROSS-REFERENCE TO RELATED APPLICATION

This application is based upon and claims the benefit of priority of the prior Japanese Patent Application No. 2011-167569, filed on Jul. 29, 2011, the entire contents of which are incorporated herein by reference.

FIELD

The embodiments discussed herein are related to optical devices, optical connectors, and optical modules.

BACKGROUND

In recent fields of technologies such as servers and high-performance computers (HPCs), improvements in performance made by the use of multiple central processing units (CPUs) have dramatically increased the transmission capacity of input/output (I/O) devices that are responsible for communication between the CPUs and external interfaces.

Meanwhile, high-speed transmission using electrical signals is limited from the viewpoints of the occurrence of crosstalk and the wiring density. Hence, studies are being made on a technique that realizes high-speed I/O with photoelectric conversion elements using light signals (optical interconnection).

To realize optical interconnection, an optical transmitter-and-receiver module is to be prepared. Exemplary optical transmitter-and-receiver modules include an optical module in which elements such as a light-emitting element and a light-receiving element are mounted face down on a substrate, and a polymer optical waveguide provided below the substrate is directly connected to the substrate. Polymer optical waveguides realize low-cost optical connection in optical modules including light-transmitting-and-receiving elements.

Polymer optical waveguides, however, have a propagation loss of about 0.04 dB/cm, which is larger than a propagation loss of about 2.4 dB/km occurring in multi-mode optical fibers. Considering that the length of optical wires provided on server boards is about 20 cm, there is a proposal (T. Shiraishi et al., OTuQ5, OFC 2011, for example) in which a polymer optical waveguide is employed for an optical transmitter-and-receiver module provided on a server board while a multi-mode optical fiber is employed for an optical transmitter-and-receiver module provided on a backplane, on which optical wires having lengths of about 1 m are provided.

There are several kinds of polymer optical waveguides manufactured by different methods ("*Introduction of optical circuit board*", Sumitomo Bakelite Co., Ltd., http://www.jp-ca.net/hikari/db/sumibe01.pdf, for example).

FIGS. 1A and 1B illustrate a method of forming a core by exposure and development (a direct exposure method) and a method of forming a cladding by exposure (a photo-addressing method), respectively, as typical examples. In the method of forming a core by exposure and development illustrated in FIG. 1A, a core layer 1002 is provided on a lower cladding layer 1001 by lamination, and a portion of the core layer 1002 that is to become the core is exposed to light through a mask 1005 and is then developed, whereby a core 1003 is obtained. Subsequently, an upper cladding layer 1004 is provided over the core 1003 by lamination. Lastly, the resultant body is baked. Thus, an optical waveguide is obtained. In this method, if the lower cladding layer 1001 and the upper cladding layer 1004 are made of the same material, the difference in refractive index between the core and the cladding may be easily made substantially the same for a direction (vertical direction) perpendicular to and a direction (horizontal direction) parallel to a surface on which the optical waveguide is held.

Such a characteristic is referred to as "isotropy" of the difference in refractive index. In this method, however, the sidewalls of the core 1003 obtained through development have some surface roughness, leading to some propagation loss that deteriorates optical performance.

In the method of forming a cladding by exposure illustrated in FIG. 1B, a lower cladding layer 1011, a core layer 1012, and an upper cladding layer 1014 are stacked by lamination, and portions of the core layer 1012 excluding a portion that is to become the core is exposed to light, whereby the refractive index of the portions of the core layer 1012 excluding the portion that is to become the core is reduced.

Thus, claddings 1016 and a core 1013 are obtained. This method does not include a development process, that is, the method includes fewer steps and is performable at a low cost. Furthermore, the sidewalls of the core 1013 do not have surface roughness. Therefore, a polymer optical waveguide having a small propagation loss is realized. Nevertheless, since the refractive index in portions of the core layer 1012 on both sides of the portion that is to become the core is reduced by chemical reaction, it is difficult to increase the difference in refractive index in the horizontal direction, i.e., the lateral direction of the core 1013.

In addition, an optical waveguide as a stack of films is easy to bend in the stacking direction. Therefore, the difference in refractive index in the direction perpendicular to the holding surface is to be increased so that the loss due to such bending is reduced.

Consequently, the difference in refractive index between the core and the cladding differs between that in the vertical direction and that in the horizontal direction of the optical waveguide. Such a characteristic is referred to as "anisotropy" of the difference in refractive index.

The above technique is discussed in Japanese National Publication of International Patent Application No. 2008-535037 and by Naomi Kawakami et al. in R2010-6, CPM2010-6, and OPE2010-6 (2010-4), reports from the Institute of Electronics, Information and Communication Engineers.

If a polymer optical waveguide in which the difference in refractive index between the core and the cladding differs between that in the vertical direction and that in the horizontal direction with respect to the surface on which the waveguide is held is optically connected to an optical fiber in which the difference in refractive index is isotropic, some optical loss occurs and the optical performance is deteriorated as described below in the description of embodiments.

Similarly, if polymer optical waveguides having different numerical-aperture (NA) characteristics are optically connected to each other, some optical loss may occur.

Hence, the following embodiments provide a mechanism that reduces the optical connection loss occurring in a case where an optical waveguide having an anisotropic difference in refractive index and an optical waveguide having an isotropic difference in refractive index are connected to each other or in a case where optical waveguides having different NA characteristics and each have an anisotropic difference in refractive index are connected to each other.

SUMMARY

According to an aspect of the invention, an optical device includes first and second optical waveguides that each include a core and a cladding; and a connector that optically couples the first optical waveguide and the second optical waveguide with a lens interposed therebetween, wherein, in at least one of the first optical waveguide and the second optical waveguide, a difference in refractive index between the core and the cladding in a first direction differs from a difference in refractive index between the core and the cladding in a second direction that is different from the first direction, and wherein, in at least one of the first optical waveguide and the second optical waveguide, a first point of emergence of first rays that are output at angles in the first direction and a second point of emergence of second rays that are output at angles in the second direction are offset from each other along an optical axis.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B illustrate related-art polymer optical waveguides.

FIGS. 2A and 2B illustrate distributions of refractive index in typical multi-mode optical fibers.

FIGS. 5A to 5C illustrate the optical connection loss occurring in cases where an anisotropic optical waveguide is connected to an isotropic optical waveguide with a lens interposed therebetween.

FIG. 18 illustrates an exemplary configuration of an optical transmitter-and-receiver module including the optical transmission line according to the first or second embodiment.

DESCRIPTION OF EMBODIMENTS

The inventor has found that the performance of related-art optical connectors may deteriorate with some optical loss if an optical waveguide in which the difference in refractive index between the core and the cladding is anisotropic and an optical waveguide in which the difference in refractive index between the core and the cladding is isotropic are optically connected to each other. This phenomenon will be described first.

FIGS. 2A and 2B illustrate distributions of refractive index in typical multi-mode optical fibers. FIG. 2A illustrates a step-index fiber, in which the refractive index is uniform in the radial direction both in the core and in the cladding. FIG. 2B illustrates a graded-index fiber, in which the refractive index changes isotropically from the center of the core toward the outer side, whereas the refractive index in the cladding is uniform. In either case, the difference in refractive index between the core and the cladding is isotropic with respect to the axis of light propagation.

Figure 3A:
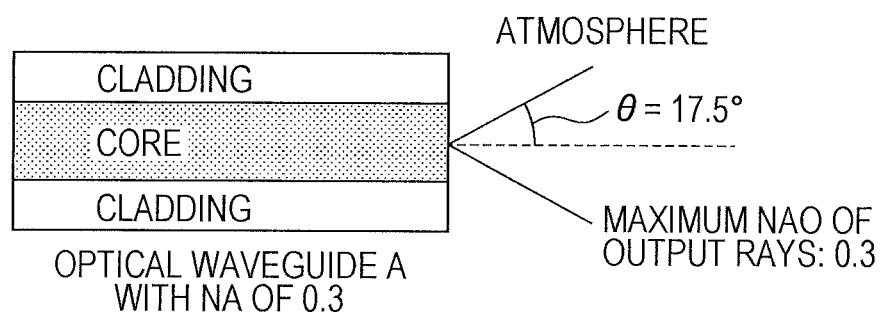
FIGS. 3A and 3B illustrate the numerical aperture (NA) of optical waveguides.
Figure 3B:
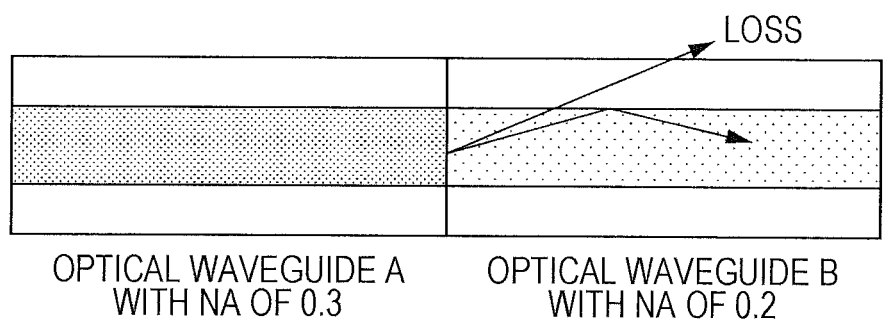

FIGS. 3A and 3B illustrate the numerical aperture (NA) of optical waveguides. The NA is determined by the difference in refractive index between the core and the cladding. Letting the refractive index of the core be n1 and the refractive index of the cladding be n2, the NA is expressed by Equation (1) below.

$$NA = \sqrt{n1^2 - n2^2} \qquad (1)$$

From the viewpoint of rays of light propagating through optical waveguides, an optical waveguide having a larger NA, i.e., a larger difference in refractive index, is more able to accommodate rays traveling at larger angles. The larger the NA of an optical waveguide, the larger the maximum angle of rays that are output from the optical waveguide. Letting the maximum angle of output rays be θ and the refractive index of the core of the optical waveguide be n1, the NA is expressed by Equation (2) below.

$$NA = n1 \times \sin(\theta) \qquad (2)$$

As is obvious from Equation (2), there is a correlation between the NA and the maximum angle of rays. Referring to FIG. 3A, in a case where light is output from an optical waveguide A having an NA of 0.3 into the atmosphere, the maximum angle of output rays is 17.5 degrees. Herein, the angle of each ray that is output from the optical waveguide is denoted by "NAO" so as to distinguish from the NA of the optical waveguide. Although FIG. 3A illustrates only rays that are output at the maximum angle as a matter of convenience, rays at smaller angles are all accommodated by the optical waveguide A. Hence, the optical waveguide A having an NA of 0.3 outputs different rays at NAOs of 0.3 and smaller. In a multi-mode optical waveguide having a large-sized core, supposing that all modes are excited, different rays at NAOs of 0.3 and smaller are output from different points of the core. The distribution of angles of output rays and the distribution of points of emergence of rays vary with the states of excitation of the modes.

Referring to FIG. 3B, suppose that the optical waveguide A having an NA of 0.3 and an optical waveguide B having an NA of 0.2 are directly connected to each other. In this case, rays at NAOs larger than 0.2 do not enter the optical waveguide B having an NA of 0.2 and are output as a loss. Supposing that all modes are excited and letting the NA on the output side be $NA_{out}$ and the NA on the input side be $NA_{in}$, an approximate value of the loss is expressed by Equation (3) below.

$$LOSS=10\times Log(NAout/NAin) \quad (3)$$

In the case where light is transmitted from the optical waveguide A having an NA of 0.3 to the optical waveguide B having an NA of 0.2, a connection loss of about 1.8 dB occurs. That is, some connection loss occurs in a case where light is transmitted from an optical waveguide having a larger NA to an optical waveguide having a smaller NA.

Figure 4A:
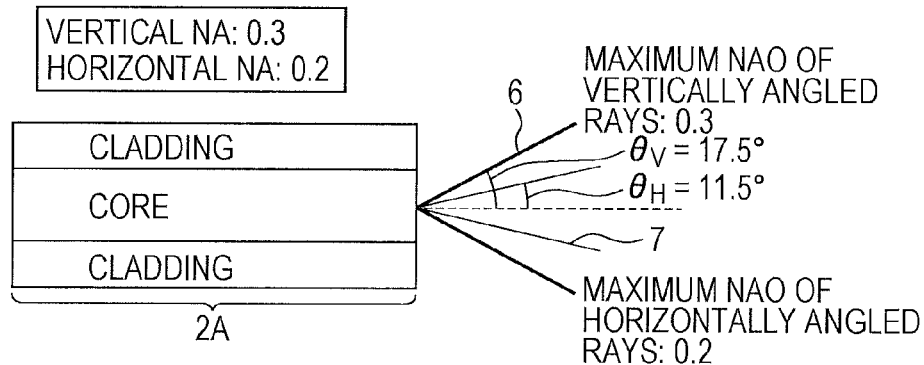
FIGS. 4A to 4C illustrate the optical connection loss occurring in cases where an anisotropic optical waveguide is directly connected to an isotropic optical waveguide.
Figure 4B:
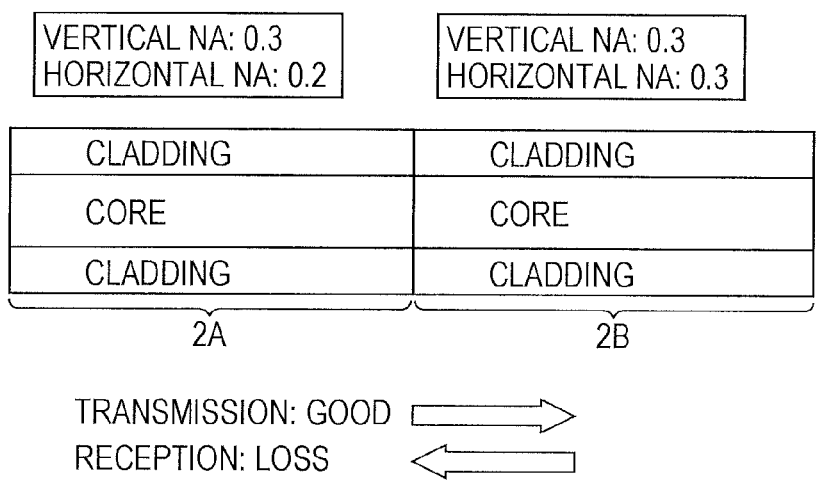
Figure 4C:
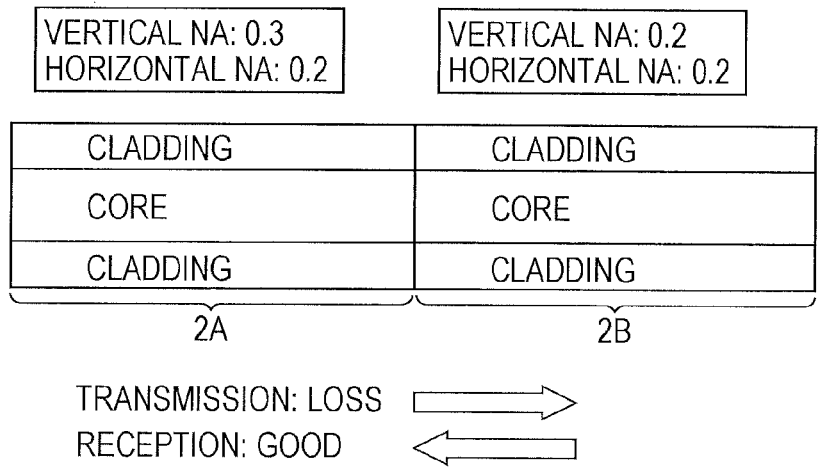

FIGS. 4A to 4C illustrate the optical connection loss occurring in cases where an optical waveguide in which the difference in refractive index is anisotropic (hereinafter referred to as "anisotropic optical waveguide") 2A and an optical waveguide in which the difference in refractive index is isotropic (hereinafter referred to as "isotropic optical waveguide") 2B are directly connected to each other. In the anisotropic optical waveguide 2A illustrated in FIG. 4A, the difference in refractive index, i.e., the NA, in a direction (vertical direction) perpendicular to a surface on which the optical waveguide A is held differs from the difference in refractive index in a direction (horizontal direction) parallel to the foregoing surface. Furthermore, the maximum NAO of rays 6 that are output from the anisotropic optical waveguide A at vertical angles also differs from the maximum NAO of rays 7 that are output from the anisotropic optical waveguide A at horizontal angles. In the following description and the relevant drawings, the term "vertical" relates to the direction perpendicular to the surface on which the optical waveguide is held, i.e., the height direction, and the term "horizontal" relates to the direction parallel to the surface on which the optical waveguide is held, i.e., the width direction.

Referring to FIG. 4A, the maximum NAO of the rays 6 that are output to the atmosphere at vertical angles is 0.3, whereas the maximum NAO of the rays 7 that are output to the atmosphere at horizontal angles is 0.2.

In the case illustrated in FIG. 4B, the anisotropic optical waveguide 2A is directly connected to the isotropic optical waveguide 2B having an NA of 0.3. In a case where light is transmitted from the anisotropic optical waveguide 2A to the isotropic optical waveguide 2B, since the NA of the isotropic optical waveguide 2B is larger than or equal to the NA of the anisotropic optical waveguide 2A, a light signal is transmitted without connection loss. In contrast, in a case where light from the isotropic optical waveguide 2B is received by the anisotropic optical waveguide 2A, some connection loss occurs in the horizontal direction, in which the NA of the anisotropic optical waveguide 2A is smaller than that of the isotropic optical waveguide 2B.

Hence, in the case illustrated in FIG. 4C, the NA of the isotropic optical waveguide 2B is reduced to 0.2 so as to match the NA of the anisotropic optical waveguide 2A in the horizontal direction. Nevertheless, some connection loss occurs in the case where light is transmitted from the anisotropic optical waveguide 2A to the isotropic optical waveguide 2B. That is, there is a mismatch in NA in one of the vertical and horizontal directions in each of the transmission case and the reception case, resulting in the occurrence of some optical connection loss.

FIGS. 5A to 5C illustrate the optical connection loss occurring in cases where an anisotropic optical waveguide 3A and an isotropic optical fiber 3B are connected to each other with a lens 5 interposed therebetween. As illustrated in FIG. 5A, the presence of the lens 5 changes the NAOs of rays traveling toward the lens 5. A typical channel pitch of optical waveguides intended for optical connectors is as dense as 250 µm. Therefore, the lens 5 is one of microlenses included in a microlens array and has a diameter of 250 µm. According to a typical manufacturing method, such a lens of very small size is formed into a symmetrical shape as a matter of processing convenience. In the lens 5, which has a symmetrical shape, the rate of change in NAO is the same for rays that are output at vertical angles and rays that are output at horizontal angles.

In the case summarized in FIG. 5B, the lens 5 is processed such that the maximum NAO of rays 7 that are output from the optical waveguide 3A at horizontal angles and are focused by the lens 5 matches the NA (0.2) of the optical fiber 3B. In this case, when light from the optical fiber 3B is received by the optical waveguide 3A, optical interconnection is realized without connection loss. In contrast, when light is transmitted from the optical waveguide 3A to the optical fiber 3B, some optical connection loss occurs because, in the vertical direction, the light traveling toward the optical fiber 3B having an NA of 0.2 includes rays at NAOs (maximum NAO=0.27) larger than the NA of the optical fiber 3B.

In the case summarized in FIG. 5C, the lens 5 is processed such that the maximum NAO of rays 6 that are output from the optical waveguide 3A at vertical angles and are focused by the lens 5 matches the NA (0.2) of the optical fiber 3B. In this case, when light is transmitted from the optical waveguide 3A to the optical fiber 3B, optical interconnection is realized without connection loss. In contrast, when light from the optical fiber 3B is received by the optical waveguide 3A, some optical connection loss occurs because, in the horizontal direction, light traveling toward the optical waveguide 3A having an NA of 0.24 includes rays at NAOs (maximum NAO=0.32) larger than the NA of the optical waveguide 3A.

With a lens processed into a symmetrical shape, even if the curvature of the lens is adjusted such that the NAs of respective optical waveguides that are connected to each other match in one of the vertical direction and the horizontal direction, there occurs a mismatch in NA in the other direction. This problem is solved by processing the lens such that the lens has an asymmetrical curvature. However, it is difficult to process each lens of microscopic size into an asymmetrical shape.

Hence, in the following embodiments, the point of emergence of rays that are output from an optical waveguide at larger NAOs and the point of emergence of rays that are output from the optical waveguide at smaller NAOs are varied (offset) from each other without changing the shape of the lens, whereby the connection loss is reduced both in the vertical direction and in the horizontal direction. Thus, efficient optical interconnection is realized.

Figure 6:
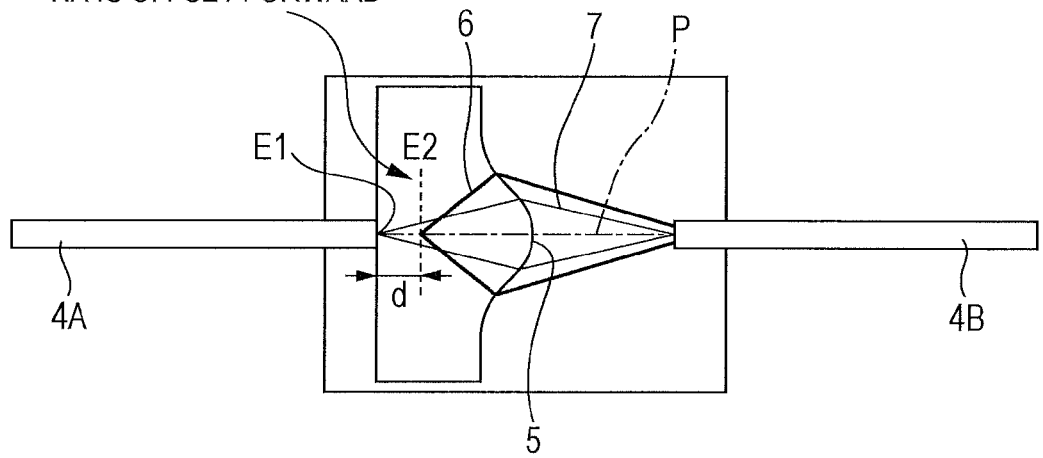
FIG. 6 is a conceptual diagram illustrating an optical transmission line according to embodiments.

FIG. 6 illustrates a basic concept of an optical transmission line 1 in which an anisotropic optical waveguide (a first waveguide) 4A and an isotropic optical fiber (a second waveguide) 4B are connected to each other with a lens 5 interposed therebetween.

The optical waveguide 4A, in which the difference in refractive index between the core and the cladding is anisotropic, has an NA of 0.32 in the vertical direction and an NA of 0.24 in the horizontal direction, for example. The maximum NAO of rays that are output from the optical waveguide 4A toward the lens 5 is 0.32 in the vertical direction and 0.24 in the horizontal direction. In this case, a point of emergence E2 of rays 6 that are output at angles in a direction corresponding to the larger NA, i.e., a direction corresponding to the larger difference in refractive index, is offset toward the lens 5 by a length d along an optical axis P with respect to a point of emergence E1 of rays 7 that are output at angles in a direction corresponding to the smaller NA, i.e., a direction corresponding to the smaller difference in refractive index.

The mechanism of offsetting the point of emergence will be described in detail separately below.

Since the point of emergence of rays that are output at angles in the direction corresponding to the larger NA is offset toward the lens 5, the maximum NAO of rays that are output from the lens 5 toward the connection counterpart, i.e., the isotropic optical fiber 4B, is changed to 0.2 both in the vertical direction and in the horizontal direction. In other words, offsetting the point of emergence of rays in accordance with the difference in NA changes the maximum NAOs in the vertical direction and the horizontal direction asymmetrically. Thus, the optical connection loss is reduced, whereby output rays from the anisotropic optical waveguide 4A are efficiently input to the isotropic optical fiber 4B.

Figure 7:
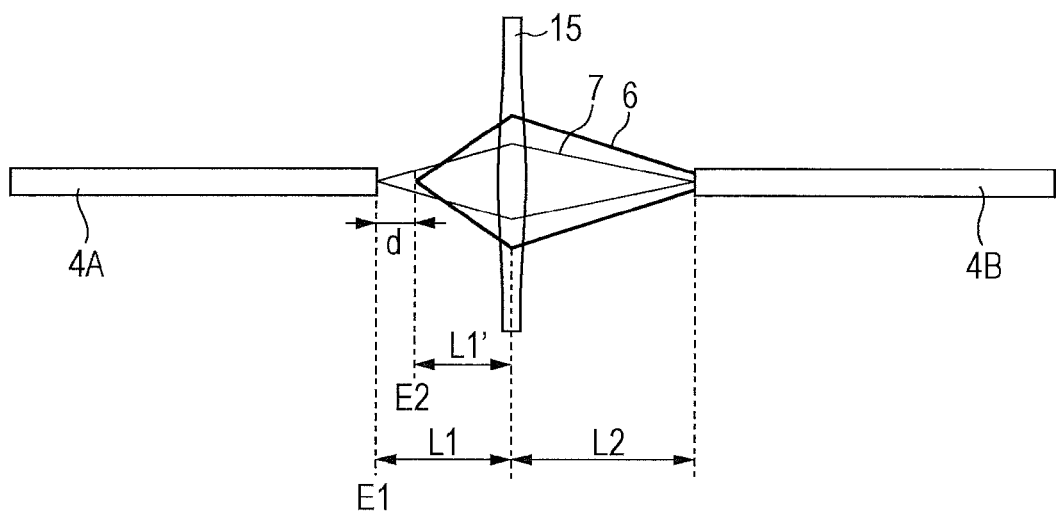
FIG. 7 illustrates the principle of the behavior of rays.

FIG. 7 illustrates the behavior of the rays, illustrated in FIG. 6, in a simple model with a sufficiently thin lens 15 surrounded by the atmosphere for ease of illustration and description. The basic principle is common to configurations employing any lens systems. In FIG. 7, the rays 6 that are output at angles in the direction corresponding to the larger NA and the rays 7 that are output at angles in the direction corresponding to the smaller NA are illustrated in one plane as a matter of convenience. Practically, the rays 6 and the rays 7 are output along different planes that are orthogonal to each other.

First, the rays 7 that are output at angles in the direction corresponding to the smaller NA will be discussed. Letting the length from the output end of the optical waveguide 4A to the lens 15 be L1 and the length from the lens 15 to the optical fiber 4B be L2, a magnification M1 of the lens 15 is expressed by M1=L2/L1. Letting the NAO of each of the rays 7 that are output from the lens 15 be $NAO_{out}$ and the NAO of each of the rays 7 that are input to the lens 15 be $NAO_{in}$, the $NAO_{out}$ is approximated by Equation (4) below.

$$NAO_{out} = \frac{NAO_{in}}{M1} = \frac{L1}{L2} \times NAO_{in} \quad (4)$$

Next, the rays 6 that are output at angles in the direction corresponding to the larger NA will be discussed. Letting the length from the output end of the optical waveguide 4A to the lens 15 be L1' and the length from the lens 15 to the optical fiber 4B be L2, a magnification M2 of the lens 15 is expressed by M2=L2/L1'. Letting the NAO of each of the rays 6 that are output from the lens 15 be $NAO'_{out}$ and the NAO of each of the rays 6 that are input to the lens 15 be $NAO'_{in}$, the $NAO'_{out}$ is approximated by Equation (5) below.

$$NAO'_{out} = \frac{NAO'_{in}}{M2} = \frac{L1'}{L2} \times NAO'_{in} \quad (5)$$

Here, $NAO'_{in} > NAO_{in}$ holds, representing an anisotropic relationship. The length d is determined by appropriately setting the lengths L1' and L1 (L1'<L1) such that $NAO'_{out} = NAO_{out}$ holds. Thus, the rays 6 and 7 that are output from the lens 15 are input to the optical fiber 4B at the same angles.

First Embodiment

Figure 8A:
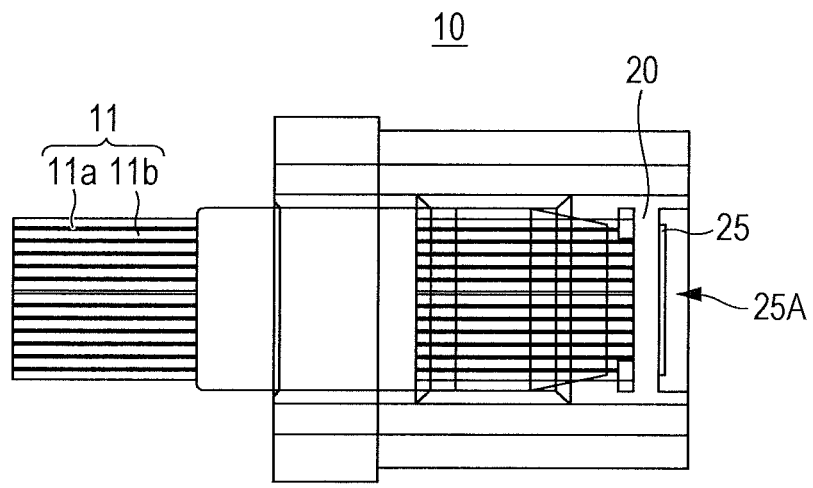
FIGS. 8A and 8B schematically illustrate an optical connector according to a first embodiment included in the optical transmission line.
Figure 8B:
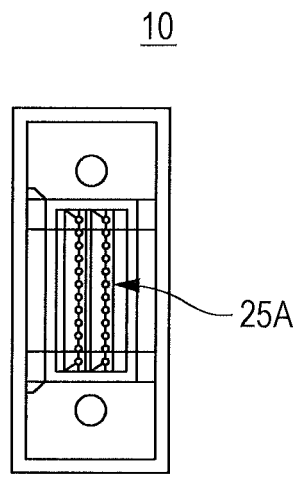

FIGS. 8A and 8B schematically illustrate an optical connector 10 according to a first embodiment included in the optical transmission line 1 illustrated in FIG. 6. FIG. 8A is a top view. FIG. 8B is a front view illustrating a surface of connection to counterpart optical waveguides. The optical connector 10 according to the first embodiment includes optical waveguides 11 and a ferrule 20 that holds the optical waveguides 11. The optical waveguides 11 are each, for example, a polymer waveguide in which the difference in refractive index between a core 11a and a cladding 11b is anisotropic. The ferrule 20 includes a lens array 25A at a position thereof facing output ends 11c of the respective optical waveguides 11. In the optical connector 10 according to the first embodiment, the ferrule 20 is configured such that the point of emergence of light that is output from the output ends 11c of the optical waveguides 11 differs between rays that are output at angles in a direction corresponding to the larger NA and rays that are output at angles in a direction corresponding to the smaller NA.

Figure 9A:
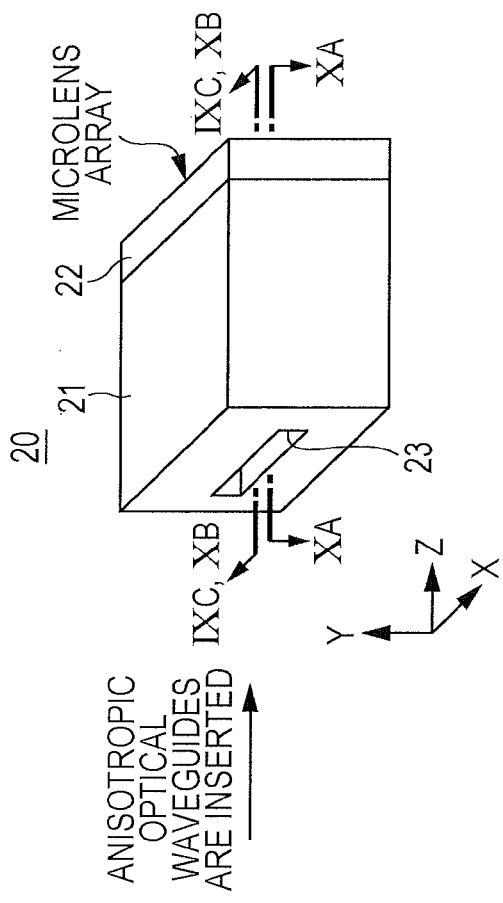
FIGS. 9A to 9C illustrate elements included in the optical connector according to the first embodiment.
Figure 9B:
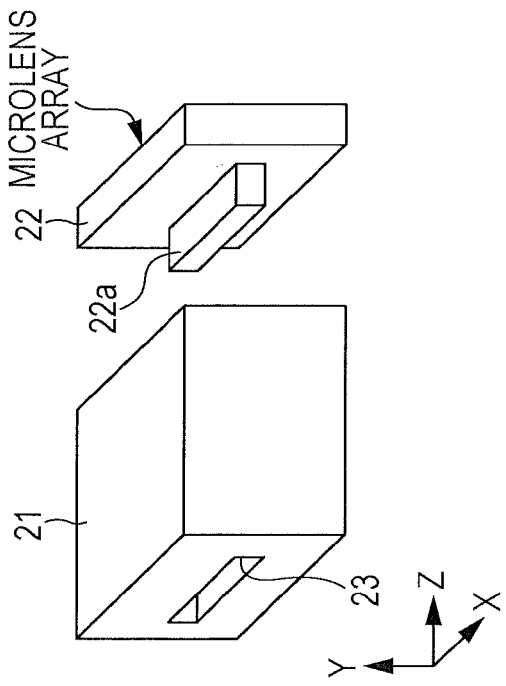
Figure 9C:
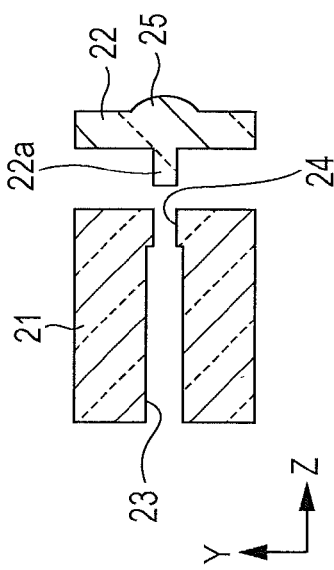

FIGS. 9A to 9C illustrate an exemplary configuration of the ferrule 20. As illustrated in FIGS. 9A to 9C, the ferrule 20 includes a first member 22 made of a material having a large refractive index and a second member 21 made of a material having a refractive index smaller than that of the material of the first member 22. The first member 22 includes lenses 25 and a projection 22a. The second member 21 includes a slit 23 that receives the optical waveguides 11, and a slit 24 that receives the projection 22a.

The first member 22 having a large refractive index is made of a transparent material. The second member 21 having a small refractive index is not limited to be transparent but is desired to function as a cladding and to be transparent, because some light enters the cladding. The projection 22a having a large refractive index is fitted into the slit 24 of the second member 21 having a small refractive index, whereby a waveguide including a core and a clad and capable of confining light only in the Y direction (the height direction) is provided.

Figure 10A:
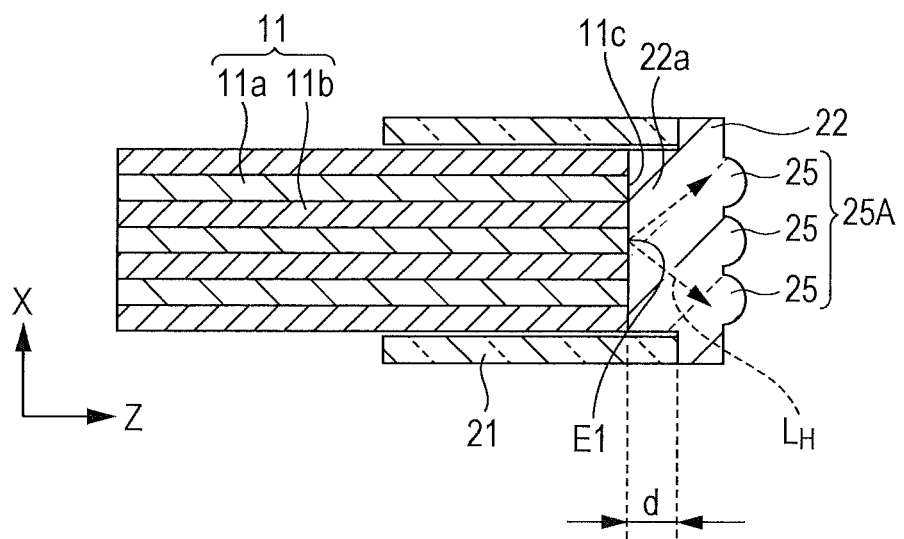
FIG. 10A is a horizontal sectional view of the optical connector according to the first embodiment.
Figure 10B:
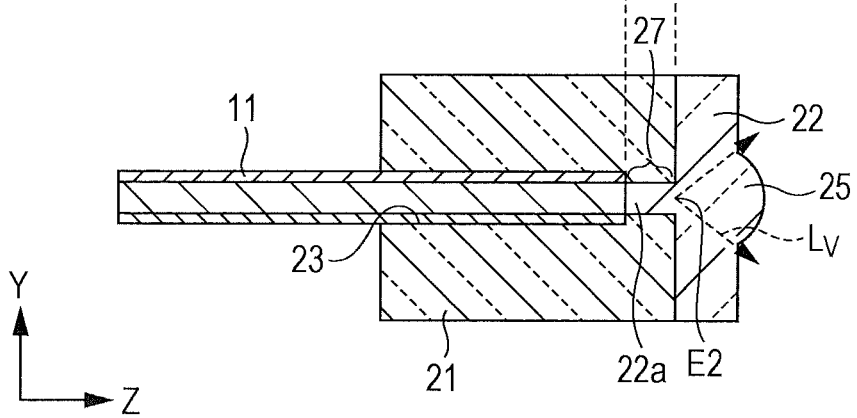
FIG. 10B is a vertical sectional view of the optical connector according to the first embodiment.

FIGS. 10A and 10B illustrate the optical connector 10 in an assembled state. The first member 22 having a large refractive index and the second member 21 having a small refractive index are fitted to each other, and the optical waveguides 11 are inserted into the second member 21. FIG. 10A is a sectional view (horizontal sectional view) taken along line XA-XA illustrated in FIG. 9B. FIG. 10B is another sectional view (vertical sectional view) taken along line XB-XB illustrated in FIG. 9B. Each of the optical waveguides 11 having an anisotropic difference in refractive index is configured as follows. For example, the core 11a has a refractive index of 1.53, portions of the cladding 11b that hold the core 11a therebetween in the vertical direction (Y direction) have a refractive index of 1.5, and portions of the cladding 11b that hold the core 11a therebetween in the horizontal direction (X direction) have a refractive index of 1.515. The difference in refractive index is larger in the vertical direction. Specifically, the NA is 0.32 in the vertical direction and 0.24 in the horizontal direction.

As illustrated in FIG. 10A, in the section taken in the horizontal (X) direction, the output end 11c of each anisotropic optical waveguide 11 is generally in contact with the projection 22a having a large refractive index, and rays $L_H$ at horizontal angles are output from a point of emergence E1. Meanwhile, as illustrated in FIG. 10B, in the section taken in the vertical (Y) direction, the projection 22a having a large refractive index is held between portions of the second member 21 having a small refractive index, whereby an extension waveguide 27 is provided. Therefore, rays $L_V$ that are output from the core 11a at vertical angles continue to undergo total internal reflection, propagate through the extension waveguide 27, and emerge from a point of emergence E2. The point of emergence E2 of the rays $L_V$ is closer to a corresponding one of the lenses 25 than the point of emergence E1 of the rays $L_H$ by the length d. In the first embodiment, d=50 μm. The first member 22 of the ferrule 20 is processed such that the length of the projection 22a is 50 μm.

To reduce the propagation loss, the refractive index of the core 11a of the optical waveguide 11 is desirably close to the refractive index of one of the members of the ferrule 20 having the larger refractive index, and the refractive index of the cladding 11b is desirably close to the refractive index of the other member of the ferrule 20 having the smaller refractive index.

In the first embodiment, the ferrule 20 is designed such that the point of emergence E2 of the rays $L_V$ that are output from each anisotropic optical waveguide 11 at angles in a first direction corresponding to the larger NA of the anisotropic optical waveguide 11 is offset toward a corresponding one of the lenses 25 with respect to the point of emergence E1 of the rays $L_H$ that are output from each anisotropic optical waveguide 11 at angles in a second direction corresponding to the smaller NA of the optical waveguide 11. If the refractive index of the optical waveguide 11 is larger in the horizontal direction than in the vertical direction, the point of emergence E1 of the rays $L_H$ that are output at horizontal angles is offset toward the lens 25. In that case, the projection 22a illustrated in FIG. 9A is provided in such a manner as to extend in the vertical (Y) direction.

First Modification

Figure 11:
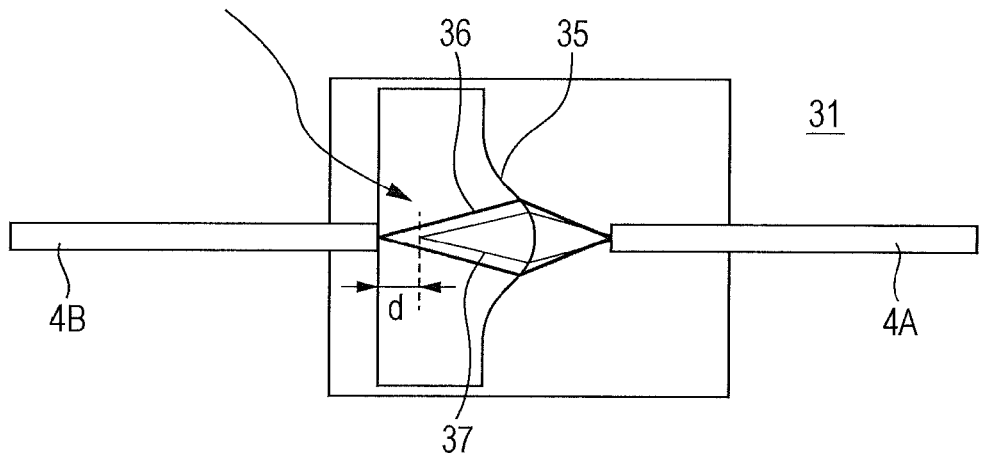
FIG. 11 is a conceptual diagram illustrating a first modification of the first embodiment.

FIG. 11 schematically illustrates an optical transmission line 31 according to a first modification of the first embodiment. In the first modification also, a first optical waveguide (for example, a polymer waveguide) 4A in which the difference in refractive index is anisotropic and a second optical waveguide (for example, an optical fiber) 4B in which the difference in refractive index is isotropic are connected to each other with a lens 35 interposed therebetween. The optical transmission line 31 differs from the optical transmission line 1 illustrated in FIG. 6 in that rays that are output from the isotropic optical fiber 4B are focused or collimated by the lens 35 and are input to the anisotropic optical waveguide 4A. In this case, the point of emergence of rays 37 that are output at angles in the direction corresponding to the smaller NA of the counterpart anisotropic optical waveguide 4A is offset toward the lens 35.

Consequently, for example, the rate of change in NAO of the rays 37, among the rays output from the optical fiber 4B, that are output at angles in the direction corresponding to the smaller NA of the counterpart anisotropic optical waveguide 4A (the horizontal direction, NA=0.24) is reduced, whereas the rate of change in NAO of rays 36 that are output at angles in the direction corresponding to the larger NA of the counterpart anisotropic optical waveguide 4A (the vertical direction, NA=0.32) is increased. Thus, efficient optical connection is realized. The effect of reducing the connection loss is large particularly when light is transmitted from the anisotropic optical waveguide 4A to the optical fiber 4B.

Figure 12:
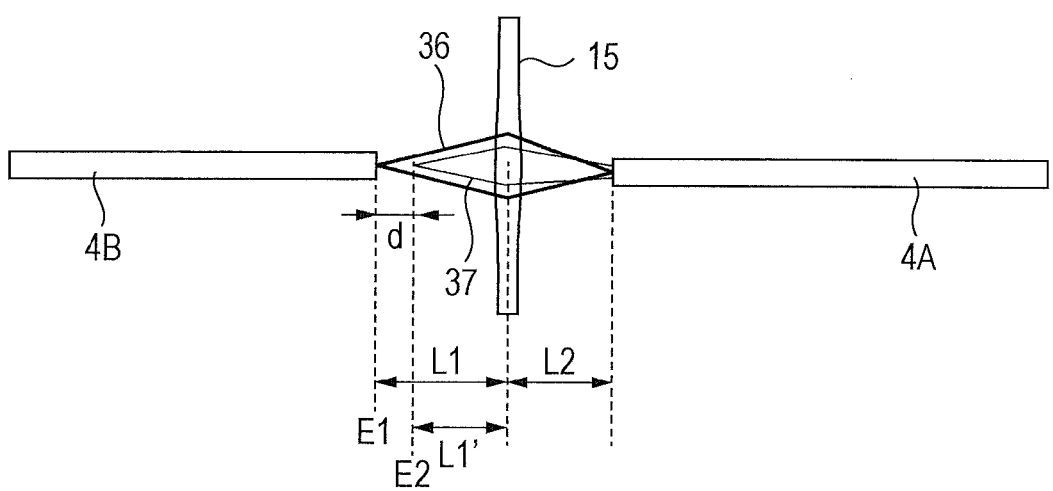
FIG. 12 illustrates the first modification.
Figure 13B:
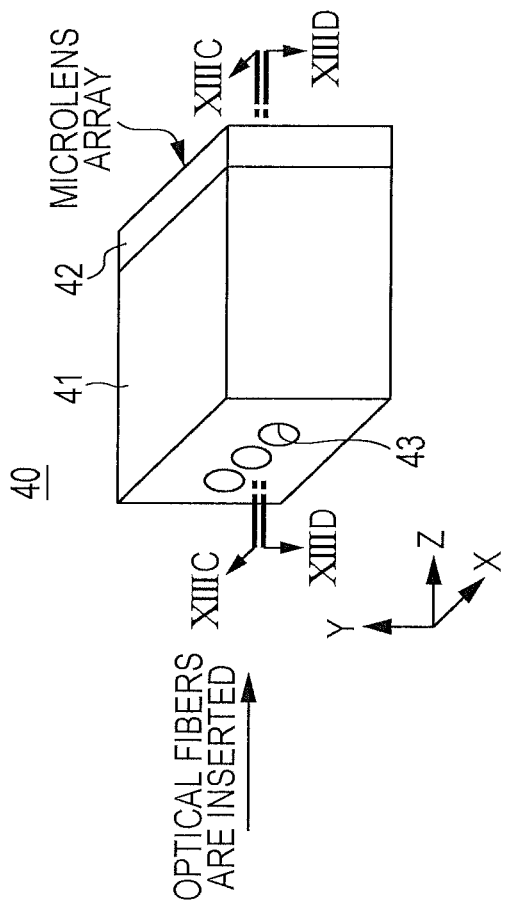
FIGS. 13A to 13D illustrate an exemplary configuration of an optical connector according to the first modification.
Figure 13D:
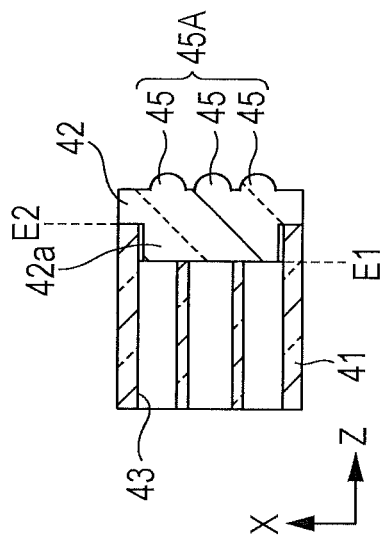
Figure 13A:
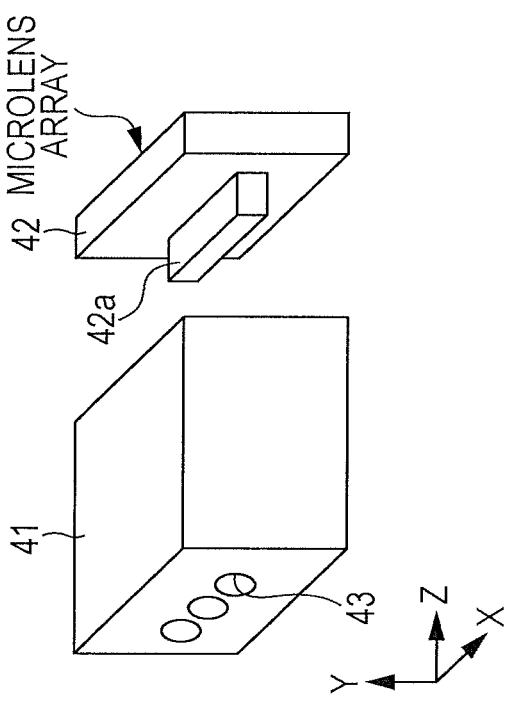
Figure 13C:
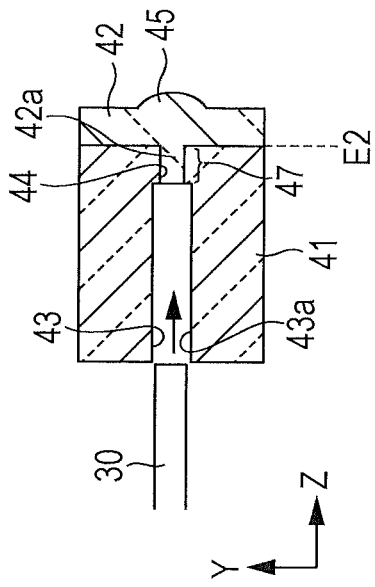

FIG. 12 illustrates the behavior of the rays 36 and 37, illustrated in FIG. 11, in a simple model with a sufficiently thin lens 15 surrounded by the atmosphere for ease of illustration and description. The basic principle is common to configurations employing any lens systems. In FIG. 12, the rays 36 that are output at angles in the direction corresponding to the larger NA of the counterpart anisotropic optical waveguide 4A and the rays 37 that are output at angles in the direction corresponding to the smaller NA of the counterpart anisotropic optical waveguide 4A are illustrated in one plane as a matter of convenience. Practically, the rays 36 and the rays 37 are output along different planes that are orthogonal to each other.

First, the rays 36 that are output at angles in the direction corresponding to the larger NA of the counterpart anisotropic optical waveguide 4A will be discussed. Letting the length from the output end of the optical fiber 4B to the lens 15 be L1 and the length from the lens 15 to the anisotropic optical waveguide 4A be L2, a magnification M1 of the lens 15 is expressed by M1=L2/L1. Letting the NAO of each of the rays 36 that are output from the lens 15 be $NAO_{out}$ and the NAO of each of the rays 36 that are input to the lens 15 be $NAO_{in}$, the $NAO_{out}$ is approximated by Equation (6) below.

$$NAO_{out} = \frac{NAO_{in}}{M1} = \frac{L1}{L2} \times NAO_{in} \qquad (6)$$

Next, the rays 37 that are output at angles in the direction corresponding to the smaller NA of the counterpart anisotropic optical waveguide 4A will be discussed. Letting the length from the output end of the isotropic optical fiber 4B to the lens 15 be L1' and the length from the lens 15 to the anisotropic optical waveguide 4A be L2, a magnification M2 of the lens 15 is expressed by M2=L2/L1'. Letting the NAO of each of the rays 37 that are output from the lens 15 be $NAO'_{out}$ and the NAO of each of the rays 37 that are input to the lens 15 be $NAO'_{in}$, the $NAO'_{out}$ is approximated by Equation (7) below.

$$NAO'_{out} = \frac{NAO'_{in}}{M2} = \frac{L1'}{L2} \times NAO'_{in} \qquad (7)$$

Here, $NAO'_{in}=NAO_{in}$ holds, representing an isotropic relationship. Setting appropriate values such that L1'<L1 holds converts the rays that are output from the optical fiber 4B into rays that match the anisotropic optical waveguide 4A in which $NAO'_{out}<NAO_{out}$.

FIGS. 13A to 13D schematically illustrate a ferrule 40 according to the first modification included in the optical transmission line 31 illustrated in FIG. 11. As illustrated in FIGS. 13A to 13D, the ferrule 40 includes a first member 42 made of a material having a large refractive index and a second member 41 made of a material having a refractive index smaller than that of the material of the first member 42. The first member 42 includes a plurality of lenses 45 and a projection 42a. The plurality of lenses 45 form a lens array 45A. The second member 41 has fitting holes 43 that receive optical fibers 30, respectively, and a slit 44 that receives the projection 42a. Lower surfaces 43a of the respective fitting holes 43 correspond to surfaces on which the respective optical fibers 30 are held.

As in the case illustrated in FIGS. 9A to 9C and FIGS. 10A and 10B, the projection 42a of the first member 42 having a large refractive index is fitted into the slit 44 of the second member 41 having a small refractive index, whereby an extension waveguide 47 including a core and a cladding and capable of confining light only in the Y direction (the height direction) is provided. Thus, the point of emergence of rays that are output from each of the optical fibers 30 at angles in the direction corresponding to the smaller NA of a counterpart anisotropic optical waveguide (the Y direction in FIG. 13C) is offset toward a corresponding one of the lenses 45 to the point E2. Meanwhile, the point of emergence of rays that are output from each of the optical fibers 30 at angles in the direction corresponding to the larger NA of the counterpart anisotropic optical waveguide (the X direction in FIG. 13D) corresponds to the point E1.

Thus, in the case where a lens is applied to the isotropic optical fiber, optical loss is also reduced and light is efficiently transmitted to the anisotropic optical waveguide.

Second Modification

Figure 14:
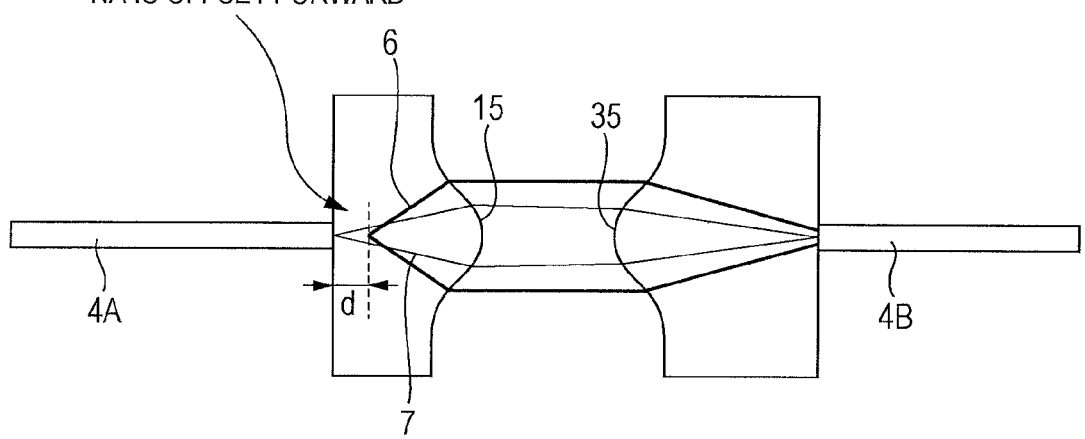
FIG. 14 is a conceptual diagram illustrating a second modification of the first embodiment.

FIG. 14 schematically illustrates an optical transmission line 51 according to a second modification of the first embodiment. The second modification concerns an application of an optical transmission line in which a counterpart connector also includes a lens. In the optical transmission line 51, a first optical waveguide (for example, a polymer waveguide) 4A in which the difference in refractive index is anisotropic and a second optical waveguide (for example, an optical fiber) 4B in which the difference in refractive index is isotropic are optically connected to each other with lenses 15 and 35 interposed therebetween. In the second modification, the lens 15 is a collimator lens, not a condenser lens.

In the case illustrated in FIG. 14, the point of emergence E2 of the rays 6 that are output at angles in the direction corresponding to the larger NA (the larger difference in refractive index) is offset only on the side of the anisotropic optical waveguide 4A toward the lens 15 with respect to the point of emergence E1 of the rays 7 that are output at angles in the direction corresponding to the smaller NA. A specific example realizing this configuration is as illustrated in FIGS. 9A to 10B. Thus, the rate of change in NAO in the vertical direction (the direction perpendicular to the surface on which the anisotropic optical waveguide 4A is held) corresponding to the larger difference in refractive index is increased, so that the maximum NAO of rays to be input to the optical fiber 4B ultimately becomes the same for both the vertical and horizontal directions.

As an alternative to the configuration illustrated in FIG. 14, the point of emergence may be varied on the side of the optical fiber 4B in accordance with the difference in NA of the counterpart anisotropic optical waveguide 4A. In that case, the configuration illustrated in FIG. 12 and FIGS. 13A to 13D may be employed. Moreover, the point of emergence may be offset both on the side of the anisotropic optical waveguide 4A and on the side of the optical fiber 4B.

Second Embodiment

Figure 15A:
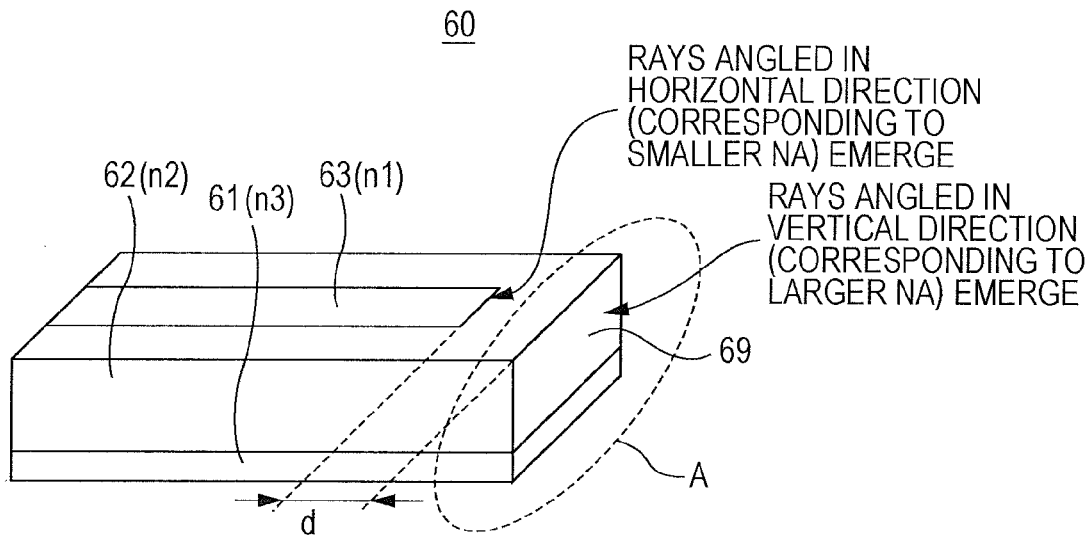
FIG. 15A is a perspective view of an optical waveguide according to a second embodiment.
Figure 15B:
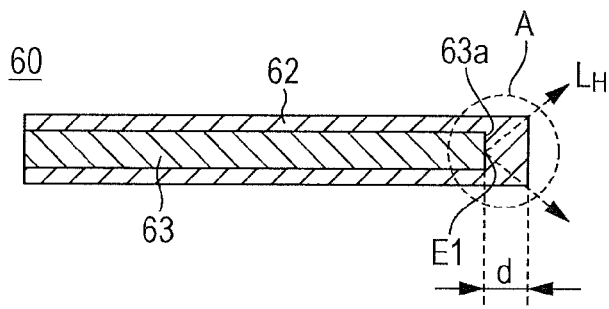
FIG. 15B is a horizontal sectional view of the optical waveguide according to the second embodiment.
Figure 15C:
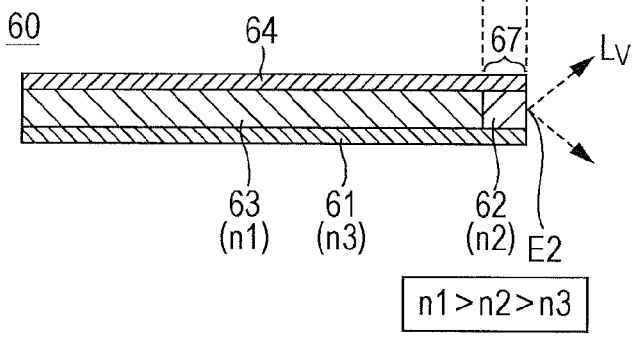
FIG. 15C is a vertical sectional view of the optical waveguide according to the second embodiment.

FIG. 15A is a perspective view of an optical waveguide 60. In FIG. 15A upper cladding is not illustrated. FIG. 15B is a horizontal sectional view of the optical waveguide 60. FIG. 15C is a vertical sectional view of the optical waveguide 60. In the first embodiment, the ferrule (a holding portion) of the optical connector includes a mechanism of offsetting the point of emergence of rays. In a second embodiment, the optical waveguide includes a mechanism of offsetting the point of emergence of rays.

The optical waveguide 60 includes a core 63, a lower cladding 61 and an upper cladding 64 that hold the core 63 therebetween in the vertical direction (the direction perpendicular to the surface on which the optical waveguide 60 is held), and a side cladding 62 surrounding the core 63 in the horizontal direction (the direction parallel to the surface on which the optical waveguide 60 is held).

Let the refractive index of the core 63 be n1, the refractive index of the side cladding 62 be n2, and the refractive index of each of the lower cladding 61 and the upper cladding 64 be n3. Then, n1>n2>n3 holds. An output end 63a of the core 63 is covered with the side cladding 62.

That is, the output end 63a of the core 63 is retracted from an end face 69 of the optical waveguide 60 by a length d. A point of emergence E1 of rays that are output at horizontal angles coincides with the output end 63a of the core 63. Meanwhile, in the vertical direction, a portion of the side cladding 62 (having the refractive index n2) defined by the length d is held between the lower cladding 61 and the upper cladding 64 (both having the refractive index n1), whereby a light-confining structure is provided.

The light-confining structure forms an extension waveguide 67, through which light continues to propagate. Therefore, the point of emergence E2 of rays that are output at vertical angles is offset toward the lens side (see FIGS. 16A to 16C) by the length d. Thus, the points of emergence of the rays output at vertical angles and the rays output at horizontal angles are offset from each other, where the difference in refractive index in the vertical direction and the difference in refractive index in the horizontal direction differ from each other.

Figure 16A:
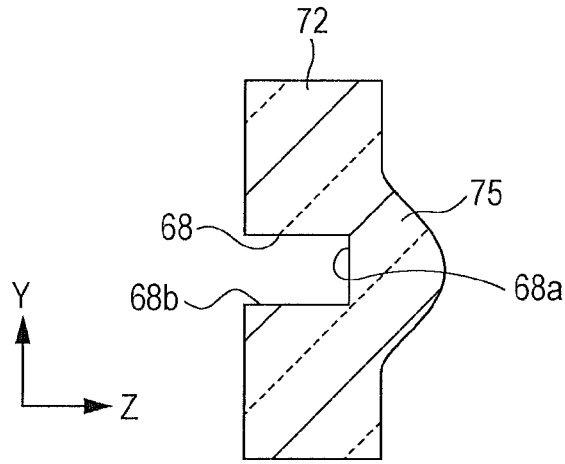
FIGS. 16A to 16C illustrate how the optical waveguide illustrated in FIGS. 15A to 15C is fitted in a lens ferrule.
Figure 16B:
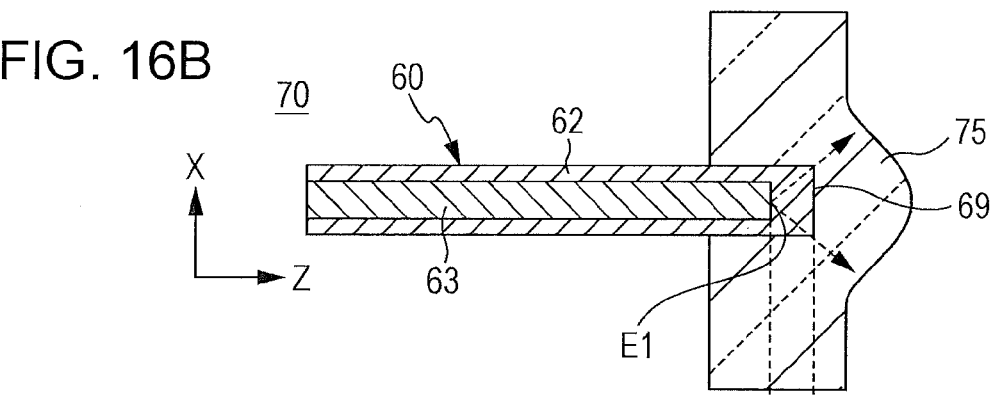
Figure 16C:
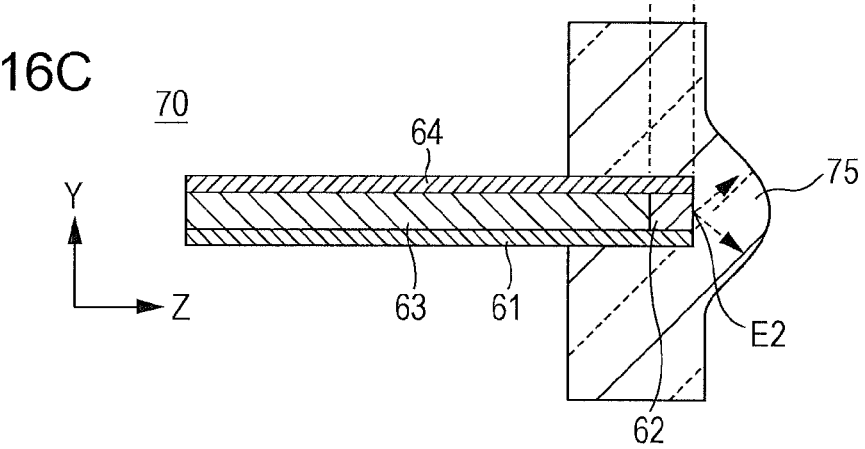

As illustrated in FIGS. 16A to 16C, the optical waveguide 60 configured as illustrated in FIGS. 15A to 15C is inserted into a slit 68 of a ferrule 72 including a lens 75, whereby an optical connector 70 is provided. In this configuration, the shape and design of the ferrule 72 are unchanged.

The optical waveguide 60 is simply inserted into the slit 68, and the end face 69 of the optical waveguide 60 is brought into contact with a bottom surface 68a of the slit 68. Thus, the points of emergence of the rays that are output at vertical (Y) angles and the rays that are output at horizontal (X) angles with respect to an optical-waveguide-holding surface 68b are offset from each other.

Figures 17A, 17B, 17C:
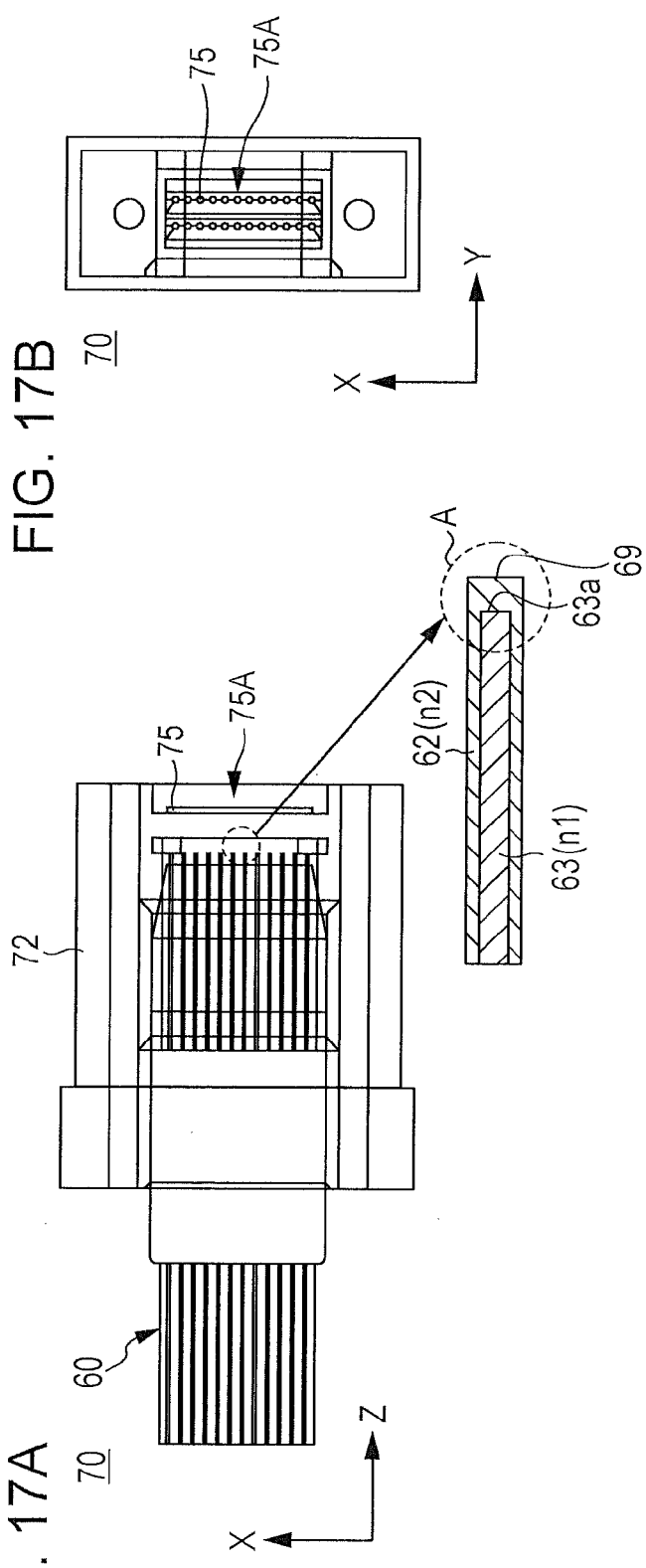
FIGS. 17A to 17C schematically illustrate an optical connector including the optical waveguide illustrated in FIGS. 15A to 15C.

FIGS. 17A to 17C illustrate the appearance of the optical connector 70 according to the second embodiment. FIG. 17A is a top view. FIG. 17B is a front view illustrating a surface of connection to a counterpart connector. FIG. 17C is a side view. As illustrated in the encircled part A in FIGS. 17A and 17C, the output end 63a of the core 63 of each optical waveguide 60 is retracted from the end face 69 of the optical waveguide 60 in the direction of insertion. The output end 63a of the core 63 is covered with the side cladding 62.

The refractive index n2 of the side cladding 62 is smaller than the refractive index n1 of the core 63 but is larger than the refractive index n3 of the lower cladding 61 and the upper cladding 64. The lower cladding 61, the upper cladding 64, and the side cladding 62 in combination form the extension waveguide 67. Thus, the point of emergence of the rays that are output at angles in the direction corresponding to the larger difference in refractive index between the core and the cladding, i.e., the larger NA, is offset toward the lens 75.

The slit 68 that receives the optical waveguide 60 may be provided in a plurality. While FIGS. 17A to 17C illustrate an exemplary configuration of an assembly in which each slit 68 receives twelve channels of optical waveguides 60, other configurations are also acceptable.

Furthermore, the ferrule 72 that holds the optical waveguides 60 may have an air hole that communicates with the slit 68. After the optical waveguides 60 are inserted into and temporarily fixed in the slit 68, adhesive may be provided. In such a case, the air hole facilitates the introduction of the adhesive into the slit 68. When the adhesive is hardened, the assembly is complete.

While FIGS. 15A to 17C illustrate a configuration in which the point of emergence is offset at an end of the anisotropic optical waveguide 60, the point of emergence may be offset at an end of the isotropic optical waveguide illustrated in FIG. 1A. In that case, referring to FIG. 1A, the output end of the core is retracted from the end face of the optical waveguide, whereby a light-transmitting member having a refractive index smaller than that of the core and larger than that of the cladding is provided over the output end of the core.

Thus, an extension waveguide that confines light only in a direction corresponding to the smaller difference in refractive index (NA) of the counterpart anisotropic optical waveguide is provided. In such a case, the configuration illustrated in FIG. 11 is realized on the side of the optical fiber 4B.

The above embodiments concern a case where an anisotropic optical waveguide and an isotropic optical waveguide are optically connected to each other with a connector. Another embodiment is also acceptable in which an anisotropic optical waveguide and an anisotropic optical waveguide are optically connected to each other with a connector. In that case also, the point of emergence of rays is varied in at least one of the two anisotropic optical waveguides.

FIG. 18 schematically illustrates an optical module 100 to which the optical transmission line according to the first or second embodiment is applied. The optical module 100 is suitable for optical interconnection between, for example, a server board and a backplane. The optical module 100 includes an optical connector 110 employing, for example, polymer waveguides 112. The polymer waveguides 112 are held by a holding portion 111 including lenses (not illustrated in FIG. 18) and are optically connected to optical fibers 122.

In the polymer waveguides 112, the difference in refractive index is anisotropic as described above. Hence, the optical connector 110 includes a mechanism of offsetting the point of emergence in the ferrule as in the first embodiment or in the polymer waveguides 112 as in the second embodiment. Therefore, the polymer waveguides 112 are connectable, with a small loss, to the optical fibers 122 in which the difference in refractive index is isotropic.

The optical module 100 includes a flexible printed circuit board (FPC) 102 and a plurality of elements 103 to 106 mounted face down on the FPC 102. The FPC 102 is made of a thin, transparent material such as polyimide. Thus, the loss in a high-frequency electrical signal is reduced.

The elements 103 to 106 include, for example, a light-emitting-element-driving integrated circuit (IC) 103 that converts an electrical signal into a light signal, a light-emitting element 104, a light-receiving element 106 that converts a light signal into an electrical signal, and a trans-impedance amplifier (TIA) 105 that converts an electrical current from the light-receiving element 106 into an electrical voltage. The light-emitting element 104 may be a vertical-cavity semiconductor-emission-laser (VCSEL) array. The light-receiving element 106 may be a photodiode (PD) array.

A lens sheet (not illustrated) made of a transparent material is provided below the FPC 102 with an adhesive layer interposed therebetween. The polymer waveguides 112 are provided below the lens sheet. The optical module 100 configured as described above reduces the connection loss between the polymer waveguides 112, which are available at a low cost, and the optical fibers 122, which are connected to the backplane.

The second embodiment, which is applicable to both single-mode optical waveguides and multi-mode optical waveguides, is more effective when applied to multi-mode optical waveguides and optical fibers including cores of large sizes. In a single-mode optical waveguide, the light source is regarded as a point light source.

In the case illustrated in FIG. 6 where NAOs are converted by using a mechanism of offsetting the point of emergence of rays, the beam diameter of light whose point of emergence is offset toward the lens is slightly widened. Such a change in the beam diameter may affect optical interconnection to some extent. In contrast, a multi-mode optical waveguide has a core of large size and includes different points functioning as light sources.

Therefore, the amount of change in the beam diameter that may occur with a mechanism of offsetting the point of emergence of rays is negligible. The above embodiments are applicable not only to optical interconnection between a polymer waveguide and an optical fiber but also to optical interconnection between polymer waveguides having different NA characteristics.

The rays may be a single wavelength in the embodiments. All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device, comprising:
   first and second optical waveguides that each include a core and a cladding; and
   a connector that optically couples the first optical waveguide and the second optical waveguide with a lens interposed therebetween,
   wherein, in at least one of the first optical waveguide and the second optical waveguide, a difference in refractive index between the core and the cladding in a first direction differs from a difference in refractive index between the core and the cladding in a second direction that is different from the first direction, and
   wherein, in at least one of the first optical waveguide and the second optical waveguide, a first point of emergence of first rays that are output at angles in the first direction and a second point of emergence of second rays that are output at angles in the second direction are offset from each other along an optical axis.

2. The optical device according to claim 1,
   wherein, letting the difference in refractive index in the first direction be a first difference in refractive index and the difference in refractive index in the second direction be a second difference in refractive index, the first difference in refractive index is larger than the second difference in refractive index, and
   wherein, in the first optical waveguide, the first point of emergence of the first rays that are output at angles in the first direction is closer to the lens than the second point of emergence of the second rays that are output at angles in the second direction.

3. The optical device according to claim 1,
   wherein, letting the difference in refractive index in the first direction be a first difference in refractive index and the difference in refractive index in the second direction be a second difference in refractive index, the first difference in refractive index is larger than the second difference in refractive index, and
   wherein, in the second optical waveguide, the second point of emergence of the second rays that are output at angles in a direction corresponding to the second difference in refractive index of the first optical waveguide is closer to the lens than the first point of emergence of the first rays that are output at angles in a direction corresponding to the first difference in refractive index of the first optical waveguide.

4. An optical connector, comprising:
an optical waveguide; and
a lens to which rays that are output from the optical waveguide are input,
wherein a first point of emergence of first rays that are output at angles in a first direction and a second point of emergence of second rays that are output at angles in a second direction that is different from the first direction are offset from each other along an optical axis,
wherein the optical waveguide includes a core and a cladding and is an anisotropic optical waveguide in which a difference in refractive index between the core and the cladding in the first direction differs from a difference in refractive index between the core and the cladding in the second direction,
wherein the first direction is a direction corresponding to a larger one of the differences in refractive index of the anisotropic optical waveguide, and the second direction is a direction corresponding to a smaller one of the differences in refractive index of the anisotropic optical waveguide, and
wherein the first point of emergence of the first rays that are output at angles in the first direction is closer to the lens than the second point of emergence of the second rays that are output at angles in the second direction.

5. An optical connector, comprising:
an optical waveguide; and
a lens to which rays that are output from the optical waveguide are input,
wherein a first point of emergence of first rays that are output at angles in a first direction and a second point of emergence of second rays that are output at angles in a second direction that is different from the first direction are offset from each other along an optical axis,
wherein the optical waveguide includes a core and a cladding and is an isotropic optical waveguide in which a difference in refractive index between the core and the cladding is isotropic,
wherein the first direction is a direction corresponding to a smaller one of differences in refractive index between a core and a cladding of an anisotropic optical waveguide as a connection counterpart, and the second direction is a direction corresponding to a larger one of the differences in refractive index of the anisotropic optical waveguide as the connection counterpart, and
wherein the first point of emergence of the first rays that are output at angles in the first direction is closer to the lens than the second point of emergence of the second rays that are output at angles in the second direction.

6. An optical connector, comprising:
an optical waveguide;
a lens to which rays that are output from the optical waveguide are input; and
a holding portion that holds the optical waveguide,
wherein a first point of emergence of first rays that are output at angles in a first direction and a second point of emergence of second rays that are output at angles in a second direction that is different from the first direction are offset from each other along an optical axis
wherein the holding portion includes
the lens and an extension waveguide that confines the rays from the optical waveguide only in the first direction,
a first member that has a first refractive index and includes the lens and a projection, the projection being provided on a side of the first member opposite the lens, and
a second member that has a second refractive index and is provided therein with a first slit that receives the optical waveguide and a second slit that receives the projection, the second refractive index being smaller than the first refractive index, and
wherein the projection of the first member received by the second slit of the second member provides the extension waveguide.

7. The optical connector according to claim 4, wherein the optical waveguide includes an extension waveguide at an end thereof facing the lens, the extension waveguide being configured to confine the rays only in the first direction.

8. The optical connector according to claim 7,
wherein the optical waveguide includes a core and a cladding and has at the end thereof a light-transmitting member having a refractive index smaller than a refractive index of the core and larger than a refractive index of the cladding, and
wherein the light-transmitting member and the cladding provide the extension waveguide configured to guide the rays from the core only in one of the first direction and the second direction.

9. The optical connector according to claim 7,
wherein the optical waveguide includes
a core that has a first refractive index n1,
a first cladding that has a second refractive index n2 and surrounds sides of the core, and
second and third claddings that have a third refractive index n3 and hold the core therebetween in a direction in which the second and third claddings and the core are stacked, and
wherein n1>n2>n3 holds.

10. An optical module comprising:
at least one photoelectric conversion element; and
an optical device including
first and second optical waveguides that each includes a core and a cladding; and
a connector that optically couples the first optical waveguide and the second optical waveguide with a lens interposed therebetween,
wherein, in at least one of the first optical waveguide and the second optical waveguide, a difference in refractive index between the core and the cladding in a first direction differs from a difference in refractive index between the core and the cladding in a second direction that is different from the first direction,
wherein, in at least one of the first optical waveguide and the second optical waveguide, a first point of emergence of first rays that are output at angles in the first direction and a second point of emergence of second rays that are output at angles in the second direction are offset from each other along an optical axis, and
wherein the optical device is optically coupled to the photoelectric conversion element.

11. The optical module according to claim 10,
wherein, in the first optical waveguide, the difference in refractive index in the first direction differs from the difference in refractive index in the second direction,
wherein, in the second optical waveguide, the difference in refractive index in the first direction is the same as the difference in refractive index in the second direction, and wherein the first optical waveguide is optically coupled to the photoelectric conversion element.

* * * * *